Aug. 17, 1954

B. CLAYTON 2,686,794

AMMONIA TREATMENT OF GLYCERIDE OILS, AND PRODUCTS RESULTING THEREFROM

Filed Sept. 14, 1950

INVENTOR.
BENJAMIN CLAYTON
BY HIS ATTORNEYS.
HARRIS, KIECH, FOSTER & HARRIS
By

Aug. 17, 1954   B. CLAYTON   2,686,794
AMMONIA TREATMENT OF GLYCERIDE OILS, AND
PRODUCTS RESULTING THEREFROM
Filed Sept. 14, 1950   3 Sheets-Sheet 2

INVENTOR.
BENJAMIN CLAYTON
BY HIS ATTORNEYS.
HARRIS, KIECH, FOSTER & HARRIS
BY

Patented Aug. 17, 1954

2,686,794

UNITED STATES PATENT OFFICE 2,686,794

AMMONIA TREATMENT OF GLYCERIDE OILS, AND PRODUCTS RESULTING THEREFROM

Benjamin Clayton, Pasadena, Calif.

Application September 14, 1950, Serial No. 184,891

40 Claims. (Cl. 260—403)

My invention relates to the use of ammonia in the treatment of glyceride oils; to gum-containing products resulting from such treatment; to the fractionation or solvent de-oiling of ammoniated gums; to the ammonia treatment of micella in the solvent extraction of oils from beans and seeds; etc.

The invention is particularly applicable to the treatment of crude glyceride oils or products obtained therefrom, such oils being of vegetable, animal or fish origin. Crude glyceride oils usually contain free fatty acids and gums which are desireably removed in the refining process. The gums consist largely of phosphatides such as lecithin, either the gums or the phosphatidic components representing valuable products.

In refining a crude glyceride oil by use of caustic alkali, the free fatty acids are saponified to produce a separable soap stock containing the gums, this soap stock often being acidulated to produce marketable free fatty acids. Such refining with caustic alkali produces several effects other than the desired removal of free fatty acids and gums. Some neutral oil is saponified and additional amounts are lost by occlusion or entrainment in the soap stock. Some of the gums are degraded by alkaline hydrolysis, evidenced by an amine odor. Subsequent acidulation of the soap stock further degrades the gums by acidic hydrolysis and causes color increase in the resulting free fatty acids. Additionally, this method of producing free fatty acids involves a double reagent cost, i. e., both alkali and acid.

I have found that a volatile alkali such as ammonia, monomethyl amine, dimethyl amine, etc., is particularly advantageous in the degumming or refining of crude glyceride oils, whether used on the crude oil itself or on such oil dissolved in a solvent, e. g., on a micella resulting from the solvent extraction of oil from source materials such as seeds, beans and the like. It is an object of the present invention to employ ammonia or other volatile alkali as the neutralizing agent in such processes, either in the form of a relatively dilute aqueous solution or in gaseous or concentrated form (usually in the presence of added water).

Ammonia is the preferred agent, and the invention will be exemplified as using this material although many of the advantages to be outlined will be realized by using other volatile alkalies.

Ammonia is a non-saponifying neutralizing agent so that treatment of a crude glyceride oil or its solution results in reacting the free fatty acids with substantially no saponification of the oil. Treatment with aqueous ammonia will remove the free fatty acids and gums with substantially no saponifiation loss. Additionally, occlusion losses of neutral oil may be brought to low levels. There is no alkaline degradation of the gums, as evidenced by the absence of an amine odor. Additionally, by subjecting the gums and/or the ammonium soaps to vacuum distillation, the ammonia is distilled out and recovered for re-use, with the direct production of free fatty acids and with no net consumption of the reagent in the process. The bottoms left in the vacuum still comprise the gums and free fatty acids, which are obtained substantially without degradation or color increase. It is an important object of the present invention to employ ammonia in the degumming or refining of glyceride oils to produce such greatly improved results.

In the combined degumming and refining of crude glyceride oils by use of ammonia, the vacuum-still bottoms, comprising gums and free fatty acids, represent a very desirable end-product mixture. For many uses, for example in margarine, soaps, greases, lubricating agents, etc., the mixed gums and free fatty acids may be used in place of either component as an emulsifying agent, an agent improving lubricating or antioxidant properties, etc. Additionally, the additive effects will usually be beneficial, particularly when the gums and free fatty acids are indigenous, i. e., naturally associated and derived from the same source material, so that there is more or less similarity between the fatty acid radicals in the gums or phosphatides and in the free fatty acids.

The presence of such free fatty acids in gums results in a new product with many new and improved uses. It is an object of the invention to produce such a product. It is also an object of the invention to produce improved products in which the aforesaid mixture of gums and free fatty acids is mixed with various oils, soaps, greases, edible products, etc.

The mixture of gums and free fatty acids has improved physical and chemical properties when used instead of the phosphatides currently available. This is due at least in part to the increased fatty acid content thereof. As compared with conventional gums, the new product shows a marked reduction in viscosity. Odor and bitter principles are absent, and the color is bright. Dispersibility in water is reduced, and the antioxidant properties of the gums prepared in accordance with the present invention surpass those of phosphatides isolated in any other manner. In the new product, the phosphatides appear to have been modified to give them unusual antioxidant properties.

In uses where surface-activity is desired, as in the smoothing of chocolate coatings or the retention of water and avoidance of spattering in margarine, the presence of the fatty acids promotes and strengthens the activity of the phosphatides. This remains true even when the acids are neutralized, as in soap manufacture, where the present mixture leads to improved detergency. When added to lubricants, the fatty acids and phosphatides improve film lubrication, wetting power and penetration, as well as increased stability against oxidation. This effect remains even in greases in which the acid component is neutralized.

In the improved product, representing a mixture of gums or phosphatides and free fatty acids, it is usually desirable that the gums or phosphatides should be a major fraction, typically about 60–65% of the mixture. The balance may be free fatty acids, together with a relatively small amount of neutral, non-acidic oil, as a carrier. The benefits of the fatty acids are not substantially realized if they are present in amount less than about 7.5–10% of the total concentrate, and better results are usually obtained with a minimum of about 12–15%. For a primarily phosphatide concentrate, the fatty acids should not exceed about 40%, but otherwise the fatty acid percentage can increase to become a major constituent. Many of the above uses remain available even when the free fatty acid content is so high that the phosphatides become a minor fraction.

The oil content of the mixture should be minimized, preferably not exceeding about 28–30%. The ratio of neutral oil to free fatty acids in the product should preferably be less than about 3 and typically much lower than the range of about 6–15 characterizing conventional gums. The oil content can be made desirably small by use of ammonia, which reduces the amount of occluded oil in the soap stock and gums from the refining step, or by de-oiling the gum and soap stock mixture before vaporizing the ammonia to form the fatty acids.

The desired portions of gums and free fatty acids are preferably obtained by a selection of the crude stock to be refined or by blends of the crude stock or by fractionation to remove free fatty acids from the product or by blending gums and free fatty acids, preferably indigenous, in the desired portions It is an object of the present invention to use such methods in the production of an oil product comprising a mixture of gums and free fatty acids.

Another object of the invention is to provide novel methods for the fractionation of gums and free fatty acids from a mixture thereof. In this manner, such a mixture can be fractionated into a product consisting primarily of oil and free fatty acids and a product consisting essentially of oil and gums.

A further object of the invention is to use ammonia in the steps employed in producing a mixed gum and free fatty acid product irrespective of the ratio of gums and fatty acids. The resulting product appears to be of an improved character when ammonia is thus employed. Additionally, the use of ammonia makes possible the direct production of the mixed product.

Another important object of the invention is to degum crude glyceride oil by use of ammonia, the ammonia being used in such limited amount as to saponify but little, if any, of the free fatty acids and being added to the crude oil as an aqueous solution or being added as a gas with a supplementary addition of a small amount of water in amount sufficient to precipitate and hydrate the ammoniated gums and improve the separability thereof. It has been found that the use of ammonia in the degumming of crude oils permits recovery of highly antioxidant gums upon vacuum distillation to remove the ammonia, these gums being of somewhat different character and of substantially improved properties as compared with gums precipitated by water or other degumming agents in the absence of ammonia. Additionally, ammonia degumming substantially reduces the amount of occluded oil in the gums. There is a complete absence of saponification or injury to the oil or to the gums. Further, the ammonia is recoverable by vacuum distillation, usually as an aqueous solution, and can be repeatedly used in the degumming operation.

It has now been determined that gums and phosphatides are at least temporarily modified while in the presence of ammonia, making it feasible to de-oil the gums and recover therefrom a high-quality oil, thus making it possible to refine a glyceride oil with negligible losses. Heretofore attempts have been made to reduce the oil losses by employment of non-saponifying neutralizing agents to avoid saponification losses but there has remained the loss resulting from the occlusion of oil in the gums. Prior attempts to de-oil water-precipitated gums by use of acetone, the agent recognized as best for the purpose, have not been commercially successful due to difficulties in maintaining an anhydrous system and the poor quality of the recovered oil. In the present process, the amount of occluded oil in the gums is not only reduced by the ammonia, if employed in the degumming or refining steps, but also the ammoniated gums make possible the solvent extraction of the occluded oil.

At room temperatures, water-precipitated gums are relatively soluble either wet or dry in oil solvents such as hexane, pentane and propane so that it is not feasible to recover occluded oil from such gums by such solvent extraction. However, in the presence of ammonia the solubility of water-wet gums in oil solvents seems to be greatly depressed. With higher boiling solvents there is some tendency for oil solvency to likewise be depressed, but with low boiling solvents such as propane it is possible to recover low phosphatide oil in excellent yield. This discovery makes possible for the first time an almost complete recovery of oil occluded in gums merely by extraction of the wet gums with a water-immiscible solvent in the presence of ammonia. Such de-oiling is not defeated by the presence of ammoniated soap stock, and the present invention includes among its objects the solvent de-oiling of ammoniated gums or a mixture of ammoniated gums and ammoniated soap stock.

Further objects and advantages of the invention will be evident to those skilled in the art in the following descriptions of exemplary processes employing ammonia at various positions in processes for recovering refined oil, free fatty acids, gums or mixtures thereof from a crude glyceride oil.

Referring to the drawings:

Fig. 2 also illustrates one method of producing the improved product comprising a mixture of gums and free fatty acids; also two ways of fractionating such a mixture into products consisting predominately of gums and free fatty acids, respectively.

Fig. 3 also illustrates one method of solvent de-oiling of the gums or of a mixture of gums and soap stock.

Figure 1:
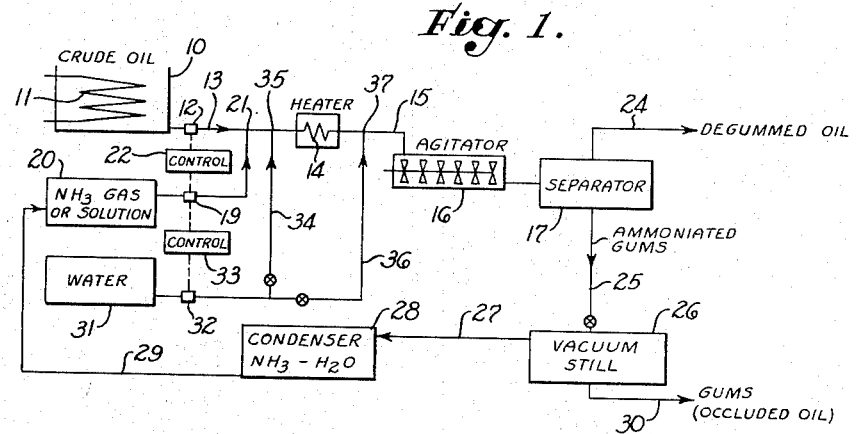
Fig. 1 is a flow diagram for a simple ammonia degumming process.

Referring particularly to the flow diagram of Fig. 1, illustrating a relatively simple degumming operation, the crude glyceride oil in tank 10 may be heated by a coil 11 before being forced by a proportioning pump 12 through a pipe 13 to a heater 14, the stream continuing its flow through a pipe 15 to a suitable agitator 16 and thence to a separator 17. A flow-control device or proportioning pump 19 will first be assumed as controlling the flow of an aqueous ammonia solution from a tank 20 to the pipe 15 to be mixed with the oil stream at a junction 21, which may be merely a right-angle connection or which may represent any mixing device for initially mixing the ammonia with the oil stream. The pumps 12 and 19 are driven and controlled as to relative speed by a proportion-control device 22 so that the crude oil and ammonia are supplied to the junction 21 in predetermined but adjustable ratio.

The heater 14 adjusts the temperature of the preliminary mixture formed at the junction 21 and serves with the agitator 16 to mix additionally the ammonia and crude oil to produce a stream in which the gums are dispersed in the degummed oil, this stream moving to the separator 17.

The agitator 16 may be a mechanical mixer of the type shown and in which mixing is obtained by rotation of paddles or it may be an elongated coil or other device in which mixing takes place due to turbulence and preferably during continuous flow. The separator 17 may be any suitable decanting device but preferably is a high-speed centrifuge continuously separating the influent stream into a stream of degummed oil, discharging through a pipe 24, and a stream of ammoniated gums, discharging through a pipe 25 to a vacuum still 26 where the gums are subjected to heat and vacuum to distill off the ammonia and water vapors. These vapors are withdrawn through a pipe 27 by means of a pump, not shown, and are delivered to a condenser 28 where the mixed vapors may be condensed to form an aqueous ammonia solution that is returned through a pipe 29 to the tank 20 for reuse in the process.

The bottoms in the vacuum still 26 represent the gums and are withdrawn by use of a suitable pump, not shown, through a pipe 30. These gums will contain a small amount of occluded oil but substantially less than if precipitated by the use of water or other degumming agents. Typically, the product discharging through the pipe 30 will represent about 70% of gums and 30% of high-quality crude or refined oil. Such gums or the ammoniated gums advancing through the pipe 25 may be de-oiled, if desired, by steps and equipment that will be later suggested.

In this and later-described processes, it is preferable to employ a closed system to exclude air and prevent the escape of ammonia; also to employ sufficient pressure to prevent ammonia vaporization prior to introduction of the gums into the vacuum still 26, the ammonia being there recovered without significant loss for continuous re-use in the process to result in a negligible reagent cost. The volatile content of the degummed oil will be negligible, typically less than 0.1%.

In this degumming process a dilute solution of ammonia is preferred, typically of a concentration of about 2–14%. The amount of aqueous ammonia will depend to some extent upon the amount of gums in the crude oil but about 1½% to 3% will usually be found to be sufficient. The degumming may be effected at various temperatures ranging from atmospheric temperature up to about 190° F., the preferred degumming temperature being between about 140° F. and 180° F., this temperature being obtained by use of the coil 11 or the heater 14 or both. The time of contact in the agitator 16 may sometimes be reduced to a low value or this agitator can sometimes be eliminated, particularly if a coil-type heater 14 is employed. Usually, however, the agitator 16 will be used, the time of contacting therein being about 5–15 minutes or for a time sufficient to effect hydration and precipitation of the gums.

Instead of using an aqueous ammonia solution for degumming, it is sometimes possible to inject a proportioned amount of gaseous ammonia, drawn from the tank 20, into the crude oil stream at the junction 21. In this instance, however, it is desirable that a proportioned amount of water be drawn from a tank 31 by a pump 32 desirably correlated in action with the pump 12 and/or the flow-control device or pump 19, as by use of a proportion-control device 33. The water is preferably added to the oil downstream from the point of ammonia addition and in amount sufficient to precipitate and hydrate the gums. Opening a valve in a pipe 34 will permit this water stream to discharge into the pipe 13 at a junction 35 ahead of the heater 14. Alternatively, it is sometimes desirable to open a valve in a pipe 36 to deliver the water to a junction 37 beyond the heater. The water aids in precipitating gums that can be easily separated continuously from the degummed oil in the separator 17. When employing gaseous ammonia, the condensate from the condenser 28 may be discharged to other equipment. Alternatively, the ammonia may be largely separated from the water, the separated materials being returned respectively to the tanks 20 and 31.

Figure 2:
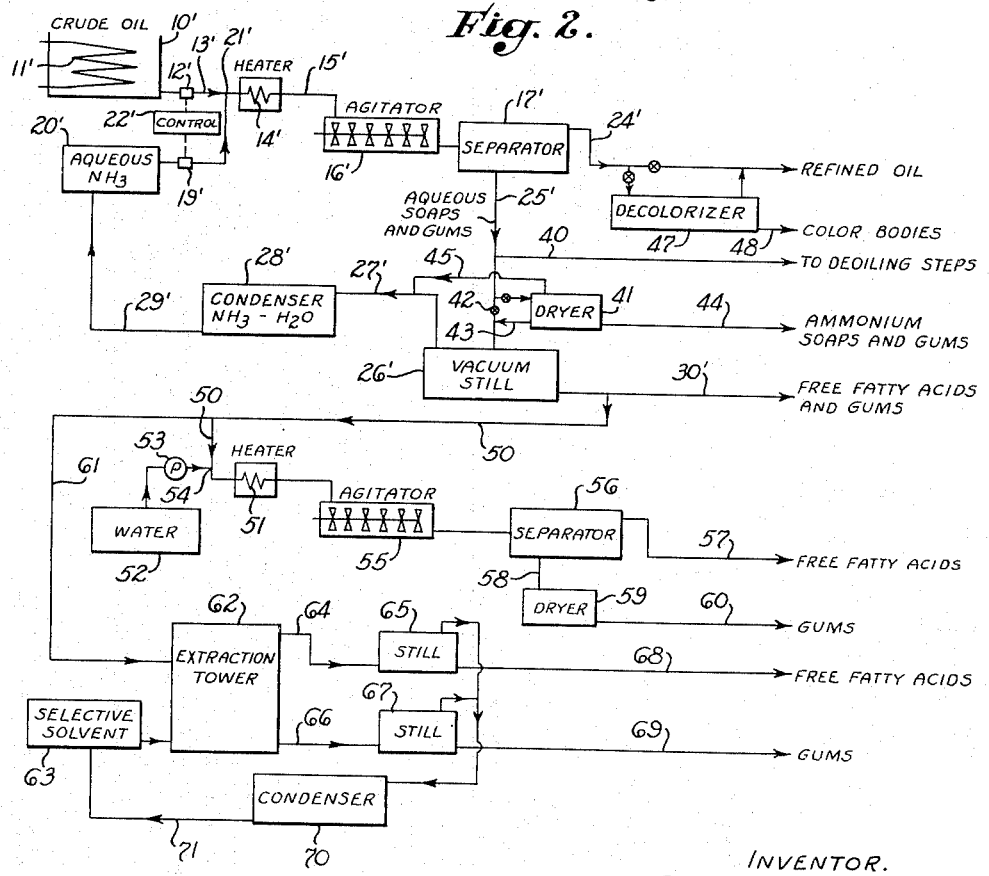
Fig. 2 is a flow diagram for the ammonia refining of a crude glyceride oil when employing sufficient ammonia to separate the gums and soap stock.

In Fig. 2 is shown a flow diagram in which sufficient aqueous ammonia is employed to neutralize the free fatty acids as well as to throw down the gums, the structural elements 10—17 and 19—22 and 24—30 being designated by corresponding primed numerals. In addition, Fig. 2 shows various other elements which will be specifically described.

Generally speaking, the operation in the initial stages of the process suggested in Fig. 2 will be similar to those previously described except that different concentrations may be used and that a larger amount of aqueous ammonia will be employed—an amount sufficient to degum the crude oil and also react the free fatty acids thereof so that the aqueous-phase material flowing through the pipe 25' from the separator 17' will be a mixture of aqueous ammoniated soaps and gums, which mixture may, if desired, be withdrawn through a pipe 40 to de-oiling equipment to be later described.

If dried, this mixture of aqueous ammoniated soaps and gums may represent a valuable product often useful where the combined effects of ammonium soaps and gums are desirable, e. g., as an emulsifying agent useful in the production of emulsions or as an additive to improve the lubricating or antioxidant qualities of oils to be used in contact with materials subject to corrosion by free fatty acids.

If the mixture is to be thus dried, it may be diverted from the pipe 25' to a dryer 41 from a position ahead of a valve 42, the dried material being either returned to the pipe 25' beyond the valve 42, as through a pipe 43, or being delivered to a point of storage or use through a pipe 44. In the dryer 41 the mixture may be subjected to heat to remove all or a part of the water and free ammonia, the vapors going through a pipe 45 to the condenser 28'. The dryer 41 need not operate under vacuum as it is desired primarily to remove all or a part of the water and the free ammonia, as distinct from decomposing most of the ammoniated soaps with the resulting reproduction of the free fatty acids.

In the preferred practice, the mixture of aqueous ammoniated soaps and gums is delivered by the pipe 25' to the vacuum still 26' where the ammonium soaps are decomposed in vacuo to reproduce the fatty acids. The vacuum still 26' is preferably indirectly heated and equipped with an agitator to keep the contents agitated during distillation, the same being true for the still 26 of Fig. 1 and the other vacuum stills to be described. The vacuum still 26' may be a single still continuously receiving the soaps and gums and providing a residence period of 1-2 hours, or it may consist of a plurality of batch units to which the influent may be supplied successively for batch treatment. Excessive temperatures productive of gum decomposition are to be avoided in the still. Preferably, sufficient vacuum is used to effect decomposition of the soaps at temperatures near 212° F. A vacuum of 20-25 inches of mercury applied for an hour or two (a still higher vacuum may be employed toward the end) will usually be found satisfactory and will produce the improved mixture of gums and free fatty acids contemplated as an object of the invention, this mixture being pumped from the vacuum still through the pipe 30'.

As the ratio of gums to free fatty acids in the mixture issuing through pipe 30' is essentially that of the crude oil in the tank 10', it is usually desirable to operate the process on a selected or blended oil which will give the desired ratio. It is usually desirable that any blended oil should be of the same type, e. g., a blend of crude soya oils, so that the gums and free fatty acids will be indigenous.

In the complete refining process of Fig. 2, sufficient ammonia can be used to neutralize the oil, and it is usually advantageous to employ an excess. The amount of water is usually at least equal to the amount of gums and preferably several fold greater and should be present at the time of separation to improve the separating action. Best results are usually obtained when employing an ammonia solution in the concentration range of about 10-15% or at least in the range of about 5-20%, using 1-10 parts per 100 parts of oil. Lower concentrations tend toward inefficient use of the ammonia and overload the stills with water. Higher concentrations may lead to ammonia loss to the oil, requiring washing, and may not provide sufficient water for adequate hydration except at the cost of using excessive quantities of ammonia. Additionally, as the concentration of the aqueous ammonia is increased the specific gravity thereof approaches that of the oil. However, the gravity differential can be increased when using either dilute or relatively concentrated solutions by mixing them with a weighting agent, typically a soluble salt, neutral or alkaline, such as ammonium chloride, ammonium sulphate, etc., to increase the density of the solution. Such a salt may be recovered from the end product, e. g., the mixed gum-fatty acid product, by extraction with a suitable solvent such as hexane, etc., leaving the salt as a residue. In a typical operation on soya oil containing 0.4% free fatty acids and 1.34% phosphatides and without use of salts as a weighting agent, 3% of aqueous ammonia made up 50-50 with concentrated ammonia and water (ammonia concentration about 14%) can be used by way of example.

Degumming and neutralization can be effected at various temperatures ranging from atmospheric temperature to about 190° F., but with 150-180° F. the preferred range and with about 160° F. as optimum for most processes. The time of contact in the agitator 16' is variable over a wide range, e. g., from about 5 to 60 minutees. Hydration and precipitation of the gums are usually best effected within a period of 15-30 minutes' duration but even an hour induces no significant saponification of the triglycerides. Here, as in the other embodiments, the oil and ammonia are mixed in a closed system out of contact with air and under a pressure not less than the vapor pressure of ammonia. The pressure in the separator may be of this magnitude also in order to avoid gassing.

The ammonia degummed and neturalized oil, issuing through the pipe 24', will normally contain substantially less than 0.1% of phosphatides and of free fatty acids. They are hence eminently qualified as highly refined oils, particularly if crude oils of light inherent color are used such as soya, sesame, peanut, corn and sunflower oils.

The ammonia refining of cottonseed oil or other highly-colored crude oils will not substantially improve the color of the oil. It is then often desirable to employ a separate decolorizing step on the refined oil issuing from the pipe 24'. This may be effected by by-passing the oil to a decolorizer 47 for separation of color bodies which may discharge through a pipe 48. The decolorizer may employ conventional steps such as mixing the refined oil with a small amount of caustic alkali followed by separation of the color bodies in a centrifuge as described, for example, in the patent to Clayton No. 2,412,251.

The mixed fatty acid and gum product, having the advantages and improved qualities outlined in the first portion of this specification, can be produced in the manner suggested in Fig. 2 or by other process steps. The product appears to have somewhat better properties in certain respects if produced from ammoniated gums and soaps, avoiding the destruction of natural antioxidants, chemical change in fatty acids, and other changes induced by contact with strong alkali and mineral acid. The improved qualities of the mixture are also in part the result of the presence of gums and fatty acids from the same crude oil or type of crude oil, such gums and fatty acids being herein termed as indigenous or naturally associated.

In this product, it is preferable that the gums or phosphatides should be a major fraction of the mixture, typically 60–65% by weight. It is also desirable that the ratio of gums to free fatty acids should usually be greater than two. However, the free fatty acids are desirably present in an amount not less than about 7.5%, based on the gum-fatty acid mixture, the preferred percentage of free fatty acids being about 12–15% although the mixture may contain about 7.5–40% of free fatty acids. The increased amount of free fatty acids, as compared with conventional gums containing about 0.3–5% of free fatty acids, appears to promote and strengthen the activity of the phophatides even when the acids are later neutralized as in the manufacture of soap or greases or when added to lubricants, as mentioned above. The increased free faty acid content also gives the product the improved physical and chemical properties, the reduction in viscosity, the absence of odor and bitter principles, the increased dispersibility in water and the better antioxidant properties, all previously suggested, particularly when the fatty acid component is indigenous and when the product is the result of ammonia refining.

This mixed gum and fatty acid product will usually contain a minor fraction of oil, desirable in many uses of the product. The oil content may be about 15–30% so that the product can be said in general to contain about 60–65% gums or phosphatides, about 7–40% and preferably about 12–15% free fatty acids, and about 15–30% oil. The ratio of neutral oil to free fatty acids should desirably be less than about 3—a ratio much lower than the range of 6–15 characterizing conventional water-precipitated gums.

As an example, the mixture of ammoniated soap stock and gums, withdrawn through the pipe 25' and containing about 45% volatiles (water+ammonia), was heated in the vacuum still 26' under 25" of vacuum for a period of two hours. The residue, an oily mixture of gums and free fatty acids, had a satisfactory low volatile content of 0.9%. It contained 65.3% phosphatides (determined by multiplying the percentage of phosphorus by 26) and had 31.9% of acetone-soluble "free oil". The latter contained 26.3% of free fatty acids. Based on the total, the free fatty acid content of the mixture was 8.4%, and the neutral oil content was 23.5%. The oil content was significantly lower than in water-precipitated gums which conventionally contain about 33% oil, evidencing a substantial decrease in neutral oil loss in the ammonia refining and in the absence of any de-oiling steps.

The mixed gums and fatty acid product in pipe 30' can be fractionated into a predominantly fatty acid fraction and a predominantly gum fraction. Fig. 2 shows two alternative fractionation methods.

As one fractionation alternative, Fig. 2 suggests withdrawal of the gum and free fatty acid mixture from the pipe 30' through a pipe 50 and delivery thereof to a heater 51 where it is heated to a temperature of about 160° F. A stream of water is pumped from a container 52 by a pump 53 and delivered to a junction 54 to mix with the mixture of free fatty acids and gums. During flow through the heater 51 and through an agitator 55, the gums will be hydrated and transferred to the aqueous phase, the material being then delivered to a separator 56, suitably a high-speed centrifuge. The lighter fraction constitutes the free fatty acid product, issuing through a pipe 57. The denser fraction, withdrawn through a pipe 58, may be passed through a dryer 59 to issue from a pipe 60 as a gum product.

As a second alternative, fractionation may be accomplished by moving the mixture of free fatty acids and gums from the pipe 30' through pipes 50 and 61 to an extraction tower 62, preferably of the countercurrent type. A selective solvent, withdrawn from a tank 63, is introduced into the tower 62 to counterflow the influent mixture and produce an upper effluent, flowing through a pipe 64 to a still 65. The influent mixture flows downwardly in the tower to form a lower effluent advancing through a pipe 66 to a still 67. Distillation of the solvent from the upper effluent in the still 65 produces a fatty acid product, discharged through a pipe 68. Similarly, distillation of the lower effluent gives a gum product flowing through a pipe 69. The vapors from the stills 65 and 67 are condensed in a condenser 70, the condensate being returned through a pipe 71 to the tank 63.

The free fatty acid products flowing through pipes 57 or 68 predominate in free fatty acids but carry respectively a small amount of gums. The composition will be commonly of the order of magnitude of 90% to 96% free fatty acids, 0.1% to 0.5% gums and 1.0% to 9.0% neutral oil. Similarly, the gum product flowing through pipes 60 or 69 will be predominantly gums or phosphatides but may carry minor amounts of fatty acids. The composition will be of the order of magnitude of 94% to 98% gums, 1% to 4% fatty acids and 1% to 3% neutral oil.

The selective solvent in the tank 63 may be acetone, ethyl alcohol, water soluble alcohols and ketones generally, or other solvent having substantial selective action as between free fatty acids and gums.

Figure 3:
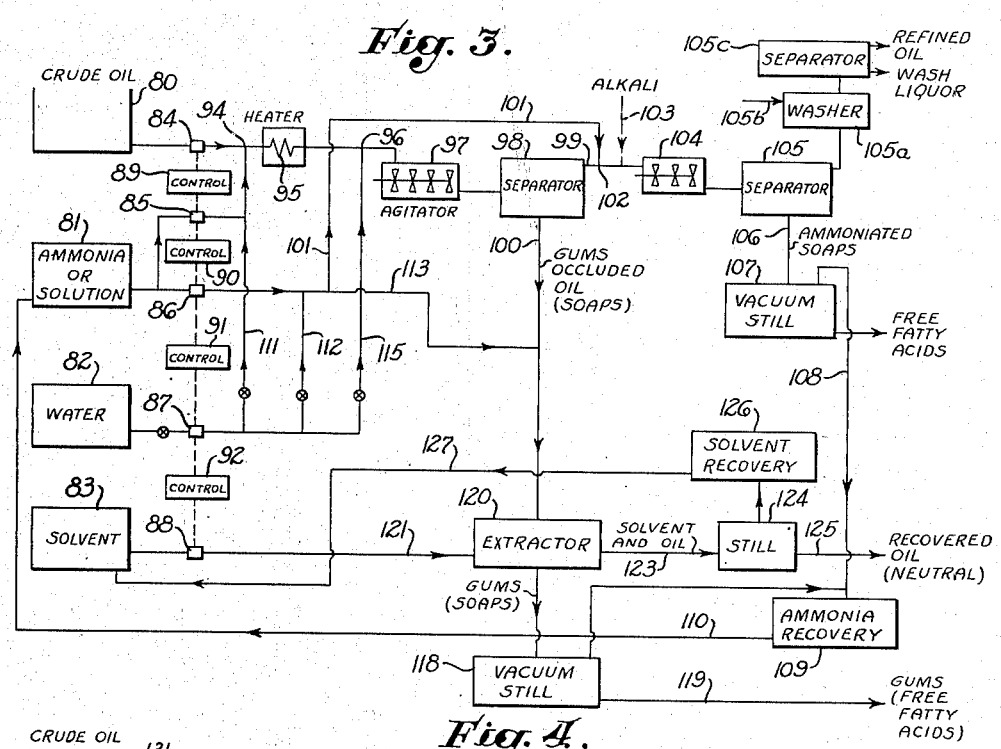
Fig. 3 is a flow diagram for a process in which a portion of the ammonia is employed for degumming or for degumming and partial refining, another portion of the ammonia being employed to complete the refining.

Fig. 3 represents a flow diagram of a process in which a portion of the ammonia may be employed in the degumming operation and another portion or some other alkali employed to react the free fatty acids. Tanks 80, 81, 82 and 83 respectively contain crude oil, ammonia, water and solvent. Proportioning devices such as pumps 84—88 are employed on the various pipes shown as extending from these tanks, being adjustably interconnected by proportion controllers 89—92 diagrammatically shown as serially connecting the pumps 84—88. Any other arrangement of proportion controllers may be employed with the end in view of proportioning the various streams.

The pump 84 proportions a stream of the crude oil to flow past a junction 94 through a heater 95, past a junction 96 and through an agitator 97 which may be any of the types previously suggested, the stream then flowing to a separator 98 such as a centrifuge. The pump 85 proportions ammonia from the tank 81 to the junction 94 to mix with the oil. This ammonia will first be assumed to be an aqueous solution appropriate for degumming the crude oil. In this connection, the aqueous solution and oil will be mixed and heated as previously described to produce a stream of oil containing ammoniated gums as an aqueous phase, this stream being separated in the separator 98 to produce a degummed oil discharging through a pipe 99 and gums including occluded oil discharging through a pipe 100.

The fatty acids of the degummed oil moving through the pipe 99 may be neutralized by additional ammonia proportioned by the pump 86 and delivered through a pipe 101 to a junction 102 of the pipe 99. Alternatively, other alkalies, preferably of the non-saponifying type such as soda ash, may be employed for neutralization instead of the ammonia, being added as indicated by the dotted arrow 103. Sufficient alkali will be employed to react any free fatty acids remaining in the degummed or partially refined oil. The alkali will be mixed in an agitator 104 and sent to a separator 105, e. g., a centrifuge, the effluents of which will be neutral oil and soaps, the latter discharging through a pipe 106.

If the neutral oil carries an undesirably high amount of suspended soaps or dissolved ammonia, these may be removed by washing with water or a salt solution, as by being delivered to a washer 105a to which water or a salt solution may be delivered as suggested by the arrow 105b, the mixture being sent to a separator 105c, the effluents of which are refined oil and the wash liquor. The refined oil may be subjected to the decolorizing step of Fig. 2, resulting in a desirable three-step process in which the oil is degummed, ammonia-neutralized and decolored.

If ammonia is used for neutralization, the soaps will be ammoniated and can be delivered by the pipe 106 to an agitator-equipped vacuum still 107 for separation of the free and combined ammonia to produce free fatty acids as shown. Even if produced from a highly colored oil, the fatty acids from the ammonium soaps are not as highly colored as the oil and can be marketed in the form produced or may be easily bleached by conventional methods. The ammonia and water vapors from the still 107 may be sent through a pipe 108 to an ammonia recovery system 109 which will include a condenser, the condensate being returned through a pipe 110 to the tank 81 for re-use in the process.

If gaseous or concentrated ammonia is present in the tank 81, it can be mixed with water after passing through the proportioning means or pump 85 by mixing therewith a stream of water from a pipe 111. In addition, water may be delivered through a pipe 112 to mix with the ammonia from the proportioning means or pump 86 preparatory to flow through the pipe 101 for neutralizing purposes. The flow of water through the pipe 112 may also be used to control the concentration of aqueous ammonia solution flowing through a pipe 113 communicating with the pipe 100 to mix the ammonia solution directly with the separated gums. Alternatively, the tank 81 may contain an ammonia solution which can be metered directly by the pump 86 into the gums advancing along the pipe 100.

The system of Fig. 3 can also be employed to effect water-precipitation of the gums by shutting off the supply of ammonia from the tank 81 and advancing water through the pipe 111 to the junction 94 or through a pipe 115 to the junction 96 beyond the heater. In this instance, the water-precipitated gums in the pipe 100 can be ammoniated by supplying ammonia through the pipe 113.

In other instances, ammonia can be delivered to the junction 94 and water delivered through the pipe 115 to the junction 96. In this event, no ammonia need usually be supplied to the gums through the pipe 113.

The process suggested in Fig. 3 is very versatile, not only in the respects indicated, but also because any desired portion of the free fatty acids can be reacted in the initial "degumming" step to appear as soaps in the stream flowing through the pipe 100. Normally, I prefer to adjust the ammonia supply to the degumming step so as to remove not more than one part of free fatty acids for two parts of gums, but other amounts of ammonia can be employed to adjust the resulting products. By distillation to remove the free and combined ammonia, as by passing the gums and soaps directly to a vacuum still 118, a mixture of gums and free fatty acids in any desired proportion can be obtained, limited only by the proportions of these materials in the starting oil. The mixed oily gums and free fatty acids, or the oily gums alone if there was substantially no reaction with free fatty acids in the degumming step, may be discharged through a pipe 119 and can be used for the purposes previously discussed.

However, it is often desirable to process the gums or the gum-soap stock mixture flowing through the pipe 100 or the pipe 25' of Fig. 2 to remove and recover occluded oil. This is accomplished by interposing an extractor 120 in the pipe 100 and proportioning a solvent from the tank 83 and pump 88 to the extractor through a pipe 121 or to the ammoniated gums before delivery to the extractor.

As previously pointed out, it has been discovered that ammoniated gums are better adapted to recovery of occluded oil by extraction with an oil solvent than are water-precipitated gums in the absence of amonia. The ammonia serves to depress the solubility of the gums in the solvent. Normally, sufficient ammonia is used in the degumming operation to give this effect, but, if desired, additional ammonia may be added through the pipe 113 to mix with the gums before reaching the extractor 120.

The solvent may be any suitable oil solvent relatively immiscible with water such as hydrocarbon or chlorinated hydrocarbon, but particularly good results are obtained by use of a liquefied normally gaseous hydrocarbon such as propane operating at atmospheric temperatures, for example, temperatures of 50° F. to 100° F., often about 75° F., to result in the formation of an oil-rich extract and a gum-rich residue. However, use of other hydrocarbons as solvents, such as pentane, hexane and heptane, will often be found to give commercially satisfactory results. The system of Fig. 3 is particularly well suited for use with such other solvents, the use of propane being preferable with an extraction system of the type shown in Fig. 4.

It is possible to remove a large part of the occluded oil from the gums by such extraction, the solvent and oil solution passing through a pipe 123 to a still 124, the bottoms of which discharge through a pipe 125 and represent a high-quality oil. The solvent vapors from the still 124 are sent to a solvent recovery system 126 where they are condensed, being later returned to the tank 88 through a pipe 127.

Figure 4:
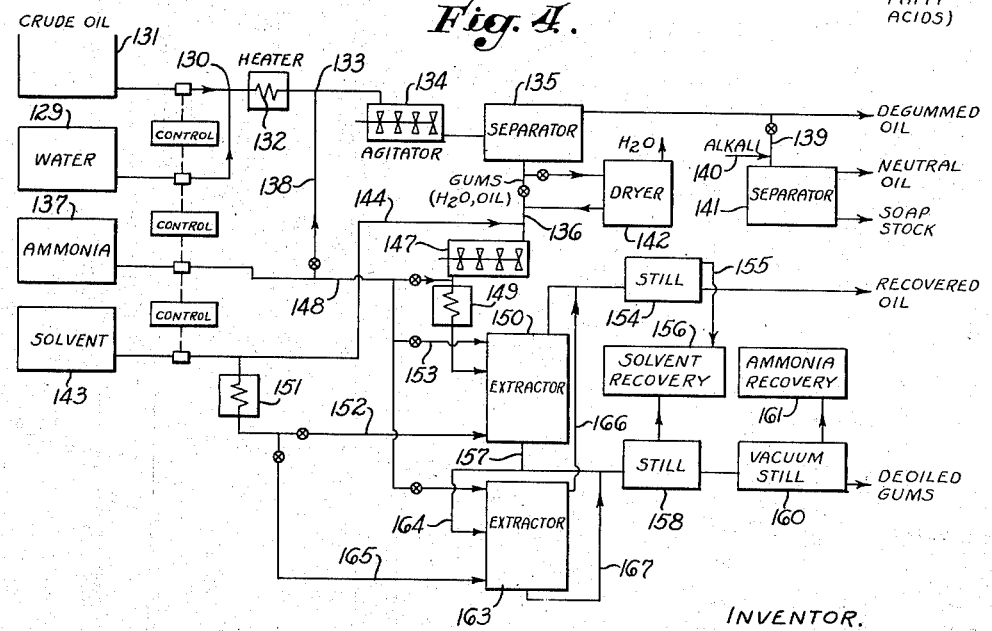
Fig. 4 is a flow diagram for a process related to Fig. 3 and discloses a method of solvent de-oiling of ammoniated gums whether produced by an ammonia refining process or by the addition of ammonia to water-precipitated gums.

Many of the sequences of Fig. 3 can be performed with equipment as arranged in Fig. 4, the latter showing a somewhat simplified arrangement for treatment of water-precipitated gums whether or not these gums are ammoniated at the time of separation from the oil. For example, by the proportioning system shown, a stream of water can be withdrawn from a tank 129 and delivered to a junction 130 to meet the crude oil stream from the tank 131 before moving through a heater 132, past a junction 133, and through an agitator 134 to a separator 135 of the type previously described.

The water hydrates and precipitates the gums which can be withdrawn through a pipe 136. The degumming may be assisted by the addition of a small amount of gaseous or aqueous ammonia drawn from a tank 137 and delivered through a pipe 138 to the junction 133.

The degummed oil from the separator 135 is in excellent condition for neutralization with an alkali, particularly when degummed with ammonia. The alkali is preferably of the non-saponifying type, such as sodium carbonate, and may be introduced into and mixed with the degummed oil flowing in a pipe 139 as suggested by the arrow 140, the mixture being sent to a separator 141 which produces neutral oil and soap stock effluents as shown.

The gums from the separator 135 and containing some occluded oil may be dried, if desired, in a dryer 142, although the presence of some water is desirable as likewise suppressing gum solubility during solvent extraction. Whether or not the gums are dried, a selective solvent from a tank 143 is delivered through a pipe 144 to the pipe 136 ahead of an agitator 147. If the gums were not ammoniated or not sufficiently ammoniated in the degumming step, ammonia from the tank 137 may be sent through a pipe 148 to mix with the gums and solvent ahead of a heat exchanger 149 preparatory to discharge into a first extractor 150. The addition of some or all of the ammonia after the solvent has been added to the gums is sometimes advantageous in permitting better contact between the gums and the solvent.

Here, as in Fig. 3, the solvent is desirably a selective one having a preferential solubility for the oil. It is desirable that the solvent be relatively water-immiscible. Hydrocarbons, chlorinated hydrocarbons and liquefied normally gaseous hydrocarbons such as propane are suitable. Here and elsewhere it should be understood that mixtures of such hydrocarbons can be employed and that when reference is made to propane, for example, the commercial propane fraction is indicated, containing some butane and ethane as well as propane, although propane itself can be employed.

Propane has a much more selective action than hydrocarbons of higher boiling point in that it maintains its solvent power for oil while undergoing a substantial reduction of solvent power for gums in the presence of aqueous ammonia, and the joint presence of the solvent and ammonia greatly increases the selectivity. For example, the effect of ammonia on propane extraction is illustrated by the following batch-type experiments: 80 grams of corn oil gums, 120 grams of water with no ammonia and 400 cc. of propane were agitated at room temperature under 140 p. s. i. After settling, the upper propane layer was found to contain 30 grams of recovered oil, but this oil assayed about 46.1% phosphatides. The test was repeated using in addition 16 grams of concentrated aqueous ammonia. The amount of oil in the upper layer was reduced somewhat but was found to contain less than 5% phosphatides demonstrating about a ten-fold increase in selectivity. It thus becomes possible, in a countercurrent system employing relatively few plates in a tower, to obtain de-oiled gums and to recover neutral oil of very low phosphatide content.

The extractor 150 may take various forms but is preferably a countercurrent extraction tower with plates or contact masses therein. The mixture of solvent and gums is adjusted in temperature in the heat exchanger 149 and brought into the extractor 150 near the middle or top. Additional quantities of the solvent from the tank 143 may be brought to temperature in a heat exchanger 151 and introduced near the bottom of the extractor through a pipe 152 to flow upward countercurrently relative to the descending gums to remove the occluded oil therefrom. If desired, water or aqueous ammonia may be introduced into the top of the extractor through a pipe 153 to flow downwardly therein. The extracted oil phase is removed from the top of the extractor 150 to a still 154, the solvent vapors moving through a pipe 155 to a solvent recovery plant 156 from which the solvent may be returned to the tank 143 for re-use. The residue from the still 154 constitutes the recovered oil which is usually a neutral oil of good quality.

The de-oiled gums are removed from the bottom of the extractor 150 through a pipe 157 (these gums are frequently too viscous to handle readily unless water is present) and may be moved to a still 158 to distill the solvent and water, the vapors being sent to the solvent recovery plant 156. The residue from the still 158 may be delivered to a vacuum still 160 if vacuum distillation to recover the ammonia is justified. In this instance, the ammonia vapors are sent to an ammonia recovery plant 161, and the ammonia may be returned to the tank 137 for re-use. The residue from the vacuum still 160 will be the de-oiled gums.

The oil content of the de-oiled gums will normally be quite low, typically less than 5.0%. The anti-oxidant properties of these gums is exceptionally high.

Frequently, it is advantageous to repeat the extraction, usually at a different temperature level, by using a second extractor 163 to which the gum phase from the pipe 157 can be delivered at an intermediate position through a pipe 164. Additional quantities of the solvent may be by-passed from the pipe 152 and delivered through a pipe 165 to the bottom of the extractor 163, which may be a tower similar to the extractor 150. The upper phase from the extractor 163 is sent through a pipe 166 to the still 154, and the lower phase is sent through a pipe 167 to the still 158 for removal of the solvent.

The beneficial combined effects of ammonia and solvent will be obtained if the ammonia is added in gaseous or aqueous form or if ammoniated gums are present. Similar beneficial results, sometimes differing in degree, will be obtained if ammonium compounds or soaps are present, particularly in solutions of alkaline reaction. The quantity of ammonia may vary widely, but I usually prefer to employ about 2 to 20% or enough to give a definite alkaline pH to the gum mixture, suitably a pH greater than 7 and preferably in the range of 8 to 9.

The de-oiling of gums has many commercial advantages. Existing equipment can be used for water degumming, neutralization, etc., and the special equipment for handling ammonia, solvent, etc., need only be large enough to handle the two or three per cent by-product represented by the gums. By substantial recovery of the oil normally lost with the gums, it becomes possible to enjoy without penalty the substantial advantages of degumming operations, namely, much lower losses in the neutralizing step, less acid in the acidulation of soap stock, no color increase of the fatty acids during acidulation, etc.

Figure 5:
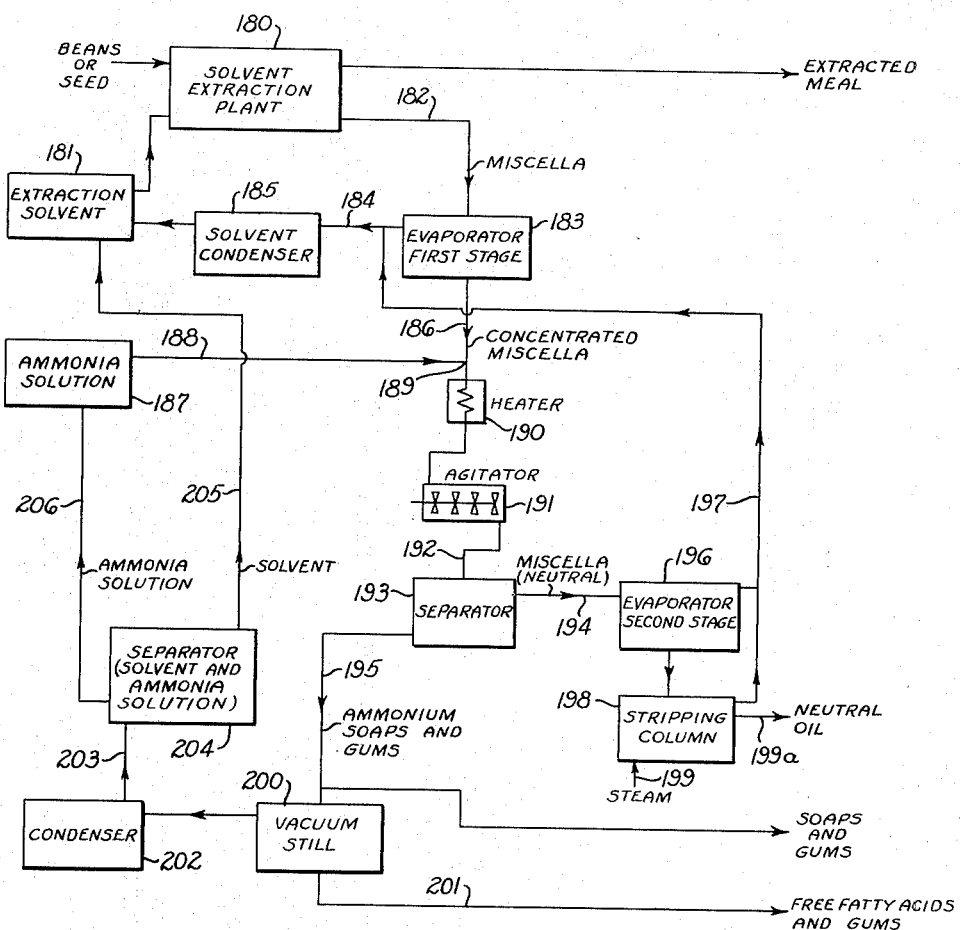
Fig. 5 is a flow diagram representing the use of ammonia in micella treatment and illustrates another method of producing the improved product comprising a mixture of free fatty acids and gums.

Fig. 5 indicates how the ammonia refining of the present invention may be advantageously employed on miscella obtained in the solvent extraction of oil from seeds or beans. The oil is extracted therefrom in the usual solvent extraction plant 180 by use of an extractive solvent drawn from a tank 181, this solvent being usually hexane, pentane or mixtures of the two.

The miscella from the solvent extraction plant 180 flows through a pipe 182, being of a typical concentration of about 80% hexane and 20% oil. For best results, the miscella is concentrated before being refined, as by being delivered to a first-stage evaporator 183, heat being supplied to vaporize a portion of the hexane, the vapors being delivered through a pipe 184 to a solvent condenser 185, the condensate being returned to the tank 181.

The concentrated miscella flows through a pipe 186 and will be of reduced hexane concentration, typically about 20%. Aqueous ammonia from a tank 187 is moved through a pipe 188 to a junction 189 of the pipe 186 to mix with the concentrated miscella and advance therewith through a heat exchanger 190 and an agitator 191 where contact is maintained for a period sufficient to hydrate and precipitate the gums and to neutralize the oil. It will usually be found sufficient if the miscella is maintained in contact with the ammonia from about 5-30 minutes at 160° F. The mixture is then passed through a pipe 192 to a separator 193, suitably a high-speed centrifuge, which effects separation of a neutral miscella discharging through a pipe 194 and ammonium soaps and gums discharging through a pipe 195.

If separation of the miscella and the soaps is not clean, the miscella may be washed with water or salt water, employing equipment similar to the washer 105a and the separator 105c of Fig. 3. Also, the soaps and gums may be washed with a solvent or treated with an electrolyte to salt out occluded oil, etc., similar to the washing and extracting step shown in Fig. 3.

In any event, the neutral miscella is desirably further concentrated by being delivered by the pipe 194 to a second-stage evaporator 196 which is not troubled from scale deposition due to the absence of the gums. An additional amount of the solvent is thus removed through a pipe 197 and delivered to the solvent condenser 185. Removal of the last several per cent of solvent is preferably accomplished by delivering the oil to a stripping column 198 to which steam is supplied through a pipe 199. The vapors are sent to the pipe 197, and the solvent condenser 185 is provided with a water trap to remove condensed steam. The residue from the stripping column 198 is withdrawn through a pipe 199a and constitutes the degummed neutral oil, usually with a free fatty acid and gum content well below 0.1%.

The ammonium soaps and gums moving through the pipe 195 are delivered to and decomposed in a vacuum still 200 to yield a residue of free fatty acids and gums, discharging through a pipe 201. Vapors from the still 200 will comprise the free and combined ammonia, water and some of the hexane or other solvent, these vapors being condensed in a condenser 202. The condensate is sent through a pipe 203 to a trap or separator 204 in which the solvent, e. g., hexane, separates out as a top layer and is removed from the aqueous ammonia, the former being sent through a pipe 205 to the tank 181, and the latter being sent through a pipe 206 to the tank 187 so that both the solvent and the ammonia can be recovered for re-use.

The hexane miscella flowing in the pipe 182 can be degummed and neutralized with ammonia at atmospheric temperature or lower, but at more elevated temperatures there is a substantial retention of soap stock and gums. However, if the miscella is concentrated in the evaporator 183, the resulting miscella, typically containing about 20% hexane, can be refined either at low or high temperatures, preferably at about 75° F., with very little retention of the soap stock and gums in the oil.

It is sometimes advantageous to use more aqueous ammonia with the miscella than in the treating of the oil in the absence of a solvent. For example, the amount of aqueous ammonia may be increased 10% or 20% or more. In a typical operation, it will be found satisfactory to use aqueous ammonia of the concentration of about 10-15% and in amount substantially in excess of the amount stoichiometrically equivalent to the free fatty acids.

In general, all of the equipment in Fig. 5 should be closed from the atmosphere and made vapor-proof whether handling ammonia or hexane. The same is true as to the equipment in Figs. 1-4 when containing ammonia or solvent. Additionally, pressures in any portion of the system containing ammonia in contact with oil or gums should be sufficiently high to prevent the presence of gaseous ammonia.

It should be understood that the showings of Figs. 1-5 are largely diagrammatic for clarity and that all valves, pumps, etc., necessary to establish the streams through the equipment described are not shown. Such auxiliary features, however, will be evident to those skilled in the art.

Various changes and modifications can be made without departing from the spirit of the invention.

I claim as my invention:

1. In a process for the refining of crude glyceride oils containing gums and free fatty acids, the steps of: mixing the crude oil with a volatile alkali and sufficient water to precipitate the gums and form hydrated gums in the oil, the amount of water being at least equal to the amount of said gums; separating the hydrated gums from the oil; and distilling the volatile alkali from the gums for re-use in the process.

2. In a process for the refining of crude glyceride oils containing gums and free fatty acids, the steps of: mixing the crude oil with ammonia and sufficient water to precipitate the gums and form ammoniated gums in the oil; separating the ammoniated gums from the oil;

and distilling the ammonia and water from the gums for re-use in the process.

3. In a process for the refining of crude glyceride oils containing gums and free fatty acids, the steps of: mixing the crude oil with an aqueous ammonia solution to form ammoniated gums in the oil; separating the ammoniated gums from the oil; subjecting the separated ammoniated gums to vacuum distillation to remove vapors comprising the ammonia and water; condensing these vapors to form a condensate; and re-using said condensate as the aqueous ammonia solution mixed with additional portions of said crude oil to effect degumming thereof.

4. A process for the refining of crude glyceride oils containing gums and free fatty acids, which process includes the steps of: mixing the crude oil with a sufficient quantity of a volatile alkali and water to precipitate said gums and react at least a portion of said free fatty acids to form soaps and hydrated gums in said oil; separating a mixture of said soaps and hydrated gums from the oil; and distilling said mixture to volatilize said alkali to produce a mixture of gums and free fatty acids.

5. A process as defined in claim 4 in which said mixing, separating and distilling steps are performed out of contact with the atmosphere.

6. A process as defined in claim 4 in which said mixing and separating steps are carried out under pressure not less than the vapor pressure of ammonia.

7. A process as defined in claim 4 in which the volatilized alkali is condensed and re-used in the process by being mixed with additional quantities of said crude oil.

8. A process as defined in claim 4 in which the mixing, separating and distilling steps are performed out of contact with air and in which the volatile alkali is a relatively dilute aqueous solution of ammonia.

9. A process for the refining of crude glyceride oils containing gums and free fatty acids, which process includes the steps of: mixing with the crude oil a sufficient quantity of ammonia and water to form an ammonium soap stock containing said gums; separating said soap stock from the oil; distilling the separated soap stock to vaporize at least a part of the ammonia and water as vapors to produce admixed free fatty acids and gums; condensing said vapors; and re-using the condensate in the process by mixing same with additional quantities of crude glyceride oil.

10. A process for the refining of crude glyceride oils containing gums and free fatty acids, which process includes the steps of: mixing the crude oil with 1 to 10 parts of an aqueous ammonia solution per 100 parts of crude oil, the aqueous ammonia solution being of a concentration of about 5–20% and the amount thereof being sufficient to precipitate said gums and react said fatty acids to form ammoniated gums and soaps; separating the resulting mixture into an oil phase and an aqueous phase containing said gums and soaps; and subsequently vaporizing ammonia from said gums and soaps to convert the latter to fatty acids.

11. A process for the refining of crude glyceride oils containing gums and free fatty acids, which process includes the steps of: mixing the crude oil with a sufficient quantity of aqueous ammonia to form an ammonium soap stock containing said gums, said aqueous ammonia being of a strength in the range of about 5–20%, the amount of ammonia employed being at least equivalent to the amount of free fatty acids in said crude oil; separating the soap stock from the oil; and distilling the separated soap stock under vacuum to drive off free and combined ammonia and water to leave a mixture of free fatty acids and gums in substantially the proportions present in said crude glyceride oil, said mixing, separating and distilling steps being performed out of contact with the atmosphere.

12. A process for the treatment of crude glyceride oils containing gums and free fatty acids, which process includes the steps of: treating the crude oil by mixing therewith ammonia and water, the amount of ammonia being sufficient to neutralize the fatty acids to form ammoniated soaps and the amount of water being sufficient to extract the gums from the oil, said treatment producing an oil in which said gums and soaps are present as an aqueous phase; separating said aqueous phase from the oil; and concentrating said aqueous phase by applying heat to vaporize at least a part of the ammonia and water therefrom.

13. A process as defined in claim 12 in which said treatment of the crude oil is carried out at a temperature in the range of about 150–180° F.

14. A process as defined in claim 12 in which concentrated ammonia is first added to the crude oil and in which water is later added to the oil, said concentrated ammonia being a material selected from the class consisting of relatively concentrated aqueous ammonia solutions and ammonia.

15. A process as defined in claim 12 in which the concentration of said aqueous phase includes at least terminal exposure to a vacuum exceeding 20″ of mercury and temperatures around 100° C.

16. A process for refining crude glyceride oils containing gums and free fatty acids, which process includes the steps of: mixing with the crude oil a limited quantity of ammonia and water to produce ammoniated gums in the oil, the amount of ammonia being insufficient to neutralize more than a small fraction of said free fatty acids; removing the ammoniated gums from the oil to leave a degummed oil still containing free fatty acids; mixing an alkali with the degummed oil to react with the free fatty acids therein to form soaps; and separating the soaps to produce a refined oil.

17. A process as defined in claim 16 in which said ammonia mixed with the crude oil is adjusted in quantity to remove not over one part of free fatty acid per two parts of gums.

18. A process for producing a product comprising a mixture of fatty acids and gums and containing at least twice as much gums as fatty acids, which process includes the steps of: mixing a crude glyceride oil having at least twice as much gums as fatty acids with sufficient ammonia and water to neutralize the acids and precipitate the gums to produce gum-containing soap stock in the oil; removing the soap stock from the oil; and vacuum distilling said soap stock to drive off free and combined ammonia and produce said product as a residue.

19. The mixed gum and free fatty acid product produced by the process of claim 18.

20. A stable phosphatidic concentrate of crude glyceride oil containing the de-ammoniated soap stock free fatty acid components of said oil.

21. A de-ammoniated phosphatidic concentrate of a crude glyceride oil containing a major portion of de-ammoniated phosphatides, not more than about 30% of said oil, and at least 7.5% free fatty acids produced from de-ammoniated soap stock.

22. A phosphatidic concentrate of a crude glyceride oil containing minor portions of oil and free fatty acids, the ratio of oil to free fatty acids being less than about 3:1.

23. A product which is the residue from a vapor-separation step and which consists of a stable mixture of a minor portion of glyceride oil, a minor portion of indigenous free fatty acids and a major portion of phosphatide-containing gums, the ratio of gums to free fatty acids being at least 2:1, the free fatty acids being at least 7.5% of the product.

24. A product consisting essentially of a mixture of indigenous de-ammoniated, phosphatide-containing gums and free fatty acids and no more than 30% of a glyceride oil.

25. A process for the refining of crude glyceride oils containing gums and free fatty acids, which process includes the steps of: mixing the crude oil with a sufficient quantity of a volatile alkali and water to precipitate the gums and react with at least a part of the fatty acids to form gum-containing soap stock; separating said gum-containing soap stock; distilling the separated soap stock to decompose the soaps and drive off the volatile alkali to leave a mixture of fatty acids and gums as a residue; fractionating said residue into a gum-rich fraction and a fatty-acid rich fraction; and separately recovering said fractions.

26. A process as defined in claim 25 in which said fractionation includes mixing the residue with an aqueous material to hydrate the gums, and separating the hydrated gums as such gum-rich fraction from said fatty-acid rich fraction.

27. A process as defined in claim 25 in which the fractionation includes mixing with said residue a solvent selective in action between gums and free fatty acids.

28. A process as defined in claim 27 in which said solvent is selected from the class consisting of water-soluble alcohols and ketones.

29. A process for separating a mixture of fatty acids and gums, which process includes the steps of: contacting the mixture with an aqueous material to hydrate the gums; and separating the hydrated gums from the fatty acids.

30. A process for separating a mixture of fatty acids and gums, which process includes the steps of: contacting said mixture with a selective solvent to form a phase rich in fatty acids and a phase rich in gums; and separating said phases.

31. A process for the miscella refining of crude glyceride oils containing gums and free fatty acids and derived from a source material such as beans or seeds, which process includes the steps of: extracting said source material with a solvent to form a miscella of solvent and oil containing gums and free fatty acids; mixing with said miscella a sufficient amount of ammonia and water to precipitate gums and react with the free fatty acids to produce ammonium soaps; separating the ammonium soaps and gums from the miscella; distilling the miscella to vaporize said solvent and leave a residue of purified oil; condensing said solvent and re-using same in said extraction; and distilling said ammonium soaps and gums to remove free and combined ammonia to leave a mixture comprising gums and free fatty acids.

32. A process as defined in claim 31 in which a portion of said solvent is evaporated from said miscella prior to contact with said ammonia to minimize the solubility of the soaps and gums in the solvent.

33. A process as defined in claim 31 in which the distillation of the soaps and gums is effected under vacuum to substantially complete the dissociation of the ammonium soaps, and in which the ammonia is re-used in the process by being mixed with additional quantities of the miscella.

34. A process for the refining of crude glyceride oils containing gums and free fatty acids, which process includes the steps of: mixing said crude oil with ammonia and water to form an aqueous phase containing said gums; separating said aqueous phase while containing occluded oil; extracting at least a part of the occluded oil from said gums by mixing with said aqueous phase a solvent that is substantially water immiscible; and then vacuum distilling the gums to recover ammonia.

35. A process as defined in claim 34 in which sufficient ammonia is employed to react substantially all of said fatty acids, said aqueous phase comprising a mixture of gums and ammoniated soaps, said vacuum distillation removing free and combined ammonia to produce a mixture of gums and free fatty acids.

36. A process for treating gums and occluded oil produced in the degumming or refining of a crude glyceride oil to recover the occluded oil, which process includes the steps of: contacting the gums and occluded oil with a selective solvent in the presence of ammonia which depresses the gum solubility in the solvent, said solvent being selected from the class consisting of hydrocarbons, chlorinated hydrocarbons and liquefied normally gaseous hydrocarbons, thereby producing an oil-rich phase and a gum-rich phase; and evaporating solvent from each of said phases.

37. A process for recovering occluded oil from gums produced in the degumming or refining of crude glyceride oils, which process includes the steps of: contacting the gums and occluded oil with propane in the presence of ammonia and at a temperature of about 50–100° F. under sufficient pressure to maintain the propane in liquid state, thereby producing an oil-rich extract and a gum-rich residue; and separating said extract and said residue.

38. A phosphatidic concentrate consisting essentially of a stable indigenous mixture of about 60–65% gums, about 7–40% free fatty acids and about 15–30% glyceride oil.

39. A phosphatidic concentrate as defined in claim 38 in which the ratio of gums to free fatty acids is greater than 2:1.

40. A phosphatidic concentrate containing free fatty acids and oil characterized by the presence of indigenous gums and fatty acids and by an increased content in free fatty acids and a reduced content in oil as compared with conventional gums, said phosphatidic concentrate containing about 60–65% of de-ammoniated gums, about 7–40% of free fatty acids and about 15–30% glyceride oil.

References Cited in the file of this patent

UNITED STATES PATENTS

| Number | Name | Date |
|---|---|---|
| 1,885,281 | Newton | Nov. 1, 1932 |
| 1,900,132 | Rosenstein | Mar. 7, 1933 |
| 2,164,012 | Hund et al. | June 27, 1939 |
| 2,288,441 | Ewing | June 30, 1942 |
| 2,416,146 | Black et al. | Feb. 18, 1947 |